(12) United States Patent
Deng et al.

(10) Patent No.: US 10,074,342 B2
(45) Date of Patent: Sep. 11, 2018

(54) HEAD-WEARABLE DISPLAY DEVICE CONNECTABLE TO A PORTABLE TERMINAL

(71) Applicant: Beijing Pico Technology Co., Ltd., Beijing (CN)

(72) Inventors: Xuebing Deng, Beijing (CN); Qiang Li, Beijing (CN); Xiangjun Ge, Beijing (CN); Yucai Han, Beijing (CN); Yuluo Wen, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/269,527

(22) Filed: Sep. 19, 2016

(65) Prior Publication Data

US 2018/0033402 A1 Feb. 1, 2018

(30) Foreign Application Priority Data

Jul. 29, 2016 (CN) .......................... 2016 1 0620220

(51) Int. Cl.
*G09G 5/00* (2006.01)
*G09G 5/12* (2006.01)
(Continued)

(52) U.S. Cl.
CPC .............. *G09G 5/12* (2013.01); *G06F 1/163* (2013.01); *G06F 1/266* (2013.01); *G06F 3/16* (2013.01); *G06F 13/4081* (2013.01); *G06F 13/4282* (2013.01); *G09G 3/2096* (2013.01); *G09G 3/36* (2013.01); *G09G 5/14* (2013.01); *G06F 3/011* (2013.01); *G09G 2330/02* (2013.01); *G09G 2370/00* (2013.01)

(58) Field of Classification Search
None
See application file for complete search history.

(56) References Cited

U.S. PATENT DOCUMENTS

2009/0182908 A1\* 7/2009 Sherman ............. G06F 13/4068
710/51
2013/0214998 A1\* 8/2013 Andes .................. G02B 27/017
345/8
(Continued)

*Primary Examiner* — Abdul-Samad A Adediran
*Assistant Examiner* — Kirk Hermann
(74) *Attorney, Agent, or Firm* — Arent Fox LLP

(57) ABSTRACT

The head-wearable display device according to the present invention is provided with one communication interface via which the head-wearable display device is connected with a portable terminal, to obtain audio and video data from the portable terminal, exchange data with the portable terminal and obtain working power supply from the portable terminal. As compared with current externally-connected type head-wearable display device which has to employ a plurality of cables, the head-wearable display device according to the present invention may operate normally in a way of connecting with the portable terminal via only one cable, without occupying too many communication interfaces of the portable terminal, avoids the problem that the head-wearable display device and portable terminal cannot establish connection because types and number of communication interfaces on the portable terminal cannot meet the needs of the head-wearable device.

7 Claims, 2 Drawing Sheets

(51) Int. Cl.
*G06F 1/16* (2006.01)
*G09G 3/36* (2006.01)
*G09G 3/20* (2006.01)
*G06F 1/26* (2006.01)
*G06F 3/16* (2006.01)
*G09G 5/14* (2006.01)
*G06F 13/42* (2006.01)
*G06F 13/40* (2006.01)
*G06F 3/01* (2006.01)

(56) References Cited

U.S. PATENT DOCUMENTS

| | | | |
|---|---|---|---|
| 2015/0213778 A1* | 7/2015 | Moravetz | G09G 5/006 345/520 |
| 2016/0188506 A1* | 6/2016 | Wang | G06F 13/287 710/106 |
| 2016/0246747 A1* | 8/2016 | Rand | G06F 13/385 |
| 2017/0227777 A1* | 8/2017 | Carollo | G02B 27/0176 |

\* cited by examiner

HEAD-WEARABLE DISPLAY DEVICE CONNECTABLE TO A PORTABLE TERMINAL

CROSS-REFERENCE TO RELATED APPLICATIONS

This application claims priority to Chinese Patent Application No. 201610620220.3, filed Jul. 29, 2016. The disclosure of the prior application is hereby incorporated in its entirety by reference.

FIELD OF THE INVENTION

The present invention relates to the technical field of virtual reality, and specifically to a head-wearable display device.

BACKGROUND OF THE INVENTION

As virtual reality technology develops, there are more and more types of virtual reality devices. Currently, commonly-used virtual reality head-wearable display devices mainly include the following types:

The first type is an externally-connected type head-wearable display device which is connected to a high-performance host machine via a plurality of cables. The host machine performs data processing, and the head-wearable display device uses its own screen to display images. The externally-connected type head-wearable display device may provide better user experience, but the host machine has an excessive size and weight and lacks good portability so that a user cannot perform virtual reality experience whenever and wherever possible.

The second type is a unitary type head-wearable display device which needn't be externally connected to the host machine and is itself responsible for performing data processing as well as image display. The unitary type head-wearable display device may refrain the user from constraints from cables and may move freely, but it results from integration of the host machine into the head-wearable device, and its performance is obviously lower than the externally-connected type head-wearable display device. Furthermore, the weight of the head-wearable portion is heavier, the device is felt obviously generating heat after having been used for a long time period, and the user's experience is not optimal.

The third type is a mobile terminal head-wearable display device which is simple in structure and usually only has a housing and an optical structure. Upon use, a mobile phone needs to be placed in the interior of the head-wearable display, the mobile phone is responsible for processing data, and a screen of the mobile phone is used to display images. The mobile terminal head-wearable display device has the same advantages as the unitary type head-wearable display device, and requires lower costs. However, since screens of different mobile phones vary, the head-wearable display device needs to be adjusted to adapt for a specific model of mobile phone. This type of head-wearable display device is inconvenient in operation and also has the same problems as the unitary type head-wearable display device such as heavy weight and heat generation of the device.

To improve the user's experience, a portable terminal such as a mobile phone may be used as the host machine of the externally-connected head-wearable display device so that the display device is portable and the user may perform virtual display experience whenever and wherever possible. As compared with the unitary type head-wearable display device and the mobile terminal head-wearable display device, the mobile phone responsible for data processing is external to the head-wearable display device and reduces the weight of the head-wearable display device. The user's head will not obviously feel the device generating heat and the head-wearable display device is adapted for wearing for a long time. However, the current externally-connected type head-wearable display device has to be connected to the host machine via a plurality of cables, e.g., at least one HDMI line is used to transmit audio and video data, at least one USB line is used to exchange and control data, and at least one power supply line is used to supply power. On one hand, some portable terminals are not provided with corresponding types of interfaces; on the other hand, a portable terminal has a limited number of communication interfaces, and many portable terminals cannot meet the need of the head-wearable display device for the number of interfaces, and therefore limit application of the externally-connected type head-wearable display device.

SUMMARY OF THE INVENTION

The present invention provides a head-wearable display device to solve the problem that the current externally-connected type head-wearable display device has to be connected to the host machine via a plurality of cables, types and number of communication interfaces on many portable terminals cannot meet the needs of the head-wearable device and therefore limit application of the externally-connected type head-wearable display device.

The head-wearable display device according to the present invention is provided with one communication interface via which the head-wearable display device is connected with a portable terminal, to obtain audio and video data from the portable terminal, exchange data with the portable terminal and obtain working power supply from the portable terminal.

Advantageous effects of the present invention are as follows: the head-wearable display device is provided with one communication interface via which the head-wearable device is connected to the portable terminal. Transmission of the audio and video data from the portable terminal to the head-wearable display device, data exchange performed between the portable terminal and the head-wearable display device, and power supply from the portable terminal to the head-wearable display device are simultaneously implemented via the interface, thereby achieving high integration of signals, reducing the number of cables needed to establish connection, facilitating designing the design of products and reducing costs of the device; as compared with current externally-connected type head-wearable display device which has to employ a plurality of cables to connect with host machine, the head-wearable display device according to the present invention may operate normally in a way of connecting with the portable terminal via only one cable, without occupying too many communication interfaces of the portable terminal. Furthermore, as the weight and size of the portable terminal is obviously less than those of the host machine in the prior art, it exhibits better portability and facilitates improvements of the user's experience.

BRIEF DESCRIPTION OF DRAWINGS

FIG. 1 is a schematic view showing a head-wearable display device according to an embodiment of the present invention is connected with a mobile phone; wherein

DETAILED DESCRIPTION OF PREFERRED EMBODIMENTS

A design idea of the present invention is as follows: at present, a current externally-connected type head-wearable display device is usually connected to the host machine via a plurality of cables, e.g., an HDMI line is used to transmit audio and video data, a USB line is used to exchange and control data, and a power supply line is used to supply power. Generally, a portable terminal has limited communication interfaces and cannot be connected with a plurality of cables. In view of this situation, the head-wearable display device according to the present invention is provided with one communication interface and connected to the portable terminal via one cable, and the portable terminal, via the interface, transmits audio and video data to the head-wearable display device, exchanges and controls data with the head-wearable display device and supplies power to the head-wearable display device, thereby solving the problem that types and number of communication interfaces on the portable terminal cannot meet the need of the head-wearable display device, reducing the number of cables by which the head-wearable display device establishes connection with the portable terminal, and reducing costs.

Embodiment 1

Figure 1A:
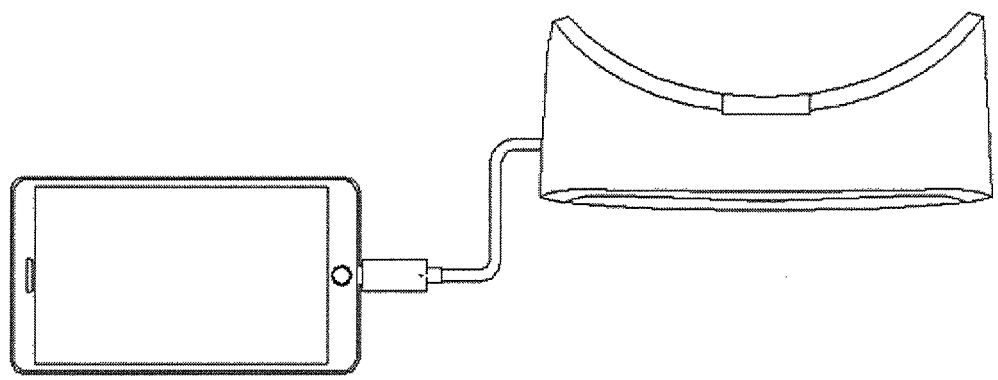
FIG. 1(a) is a top view.
Figure 1B:
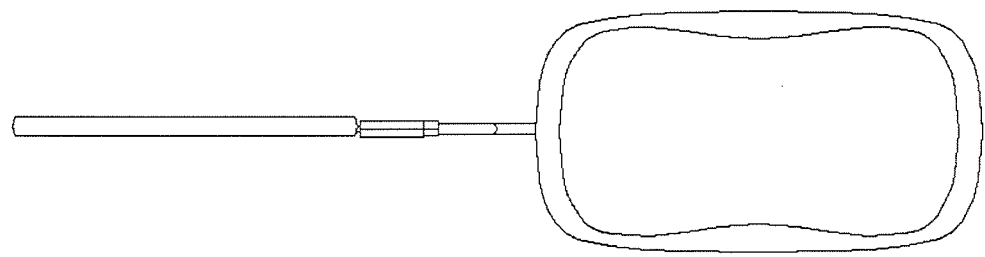
FIG. 1(b) is a front view.

FIG. 1 is a schematic view showing a head-wearable display device according to an embodiment of the present invention is connected with a mobile phone; wherein FIG. 1(a) is a top view, and FIG. 1(b) is a front view. Referring to FIG. 1, the head-wearable display device is provided with one communication interface via which the head-wearable display device is connected with the mobile phone. Via the interface, the head-wearable display device may obtain audio and video data from the mobile phone, exchange data with the mobile phone and obtain working power supply from the mobile phone.

As shown in FIG. 1, in the present embodiment, the audio and video data, data signal and power supply signal are all integrated into one communication interface, so the head-wearable device according to the present embodiment may operate normally in a way of being connected to the mobile phone only via one cable, solves the problem that the current head-wearable display device has to be connected to the host machine via a plurality of cables and therefore cannot be applied to the mobile phone, the weight and size of the mobile phone is obviously less than those of the current host machine and has better portability, furthermore, the required number of cables is reduced, and the cost of the device is lowered.

The communication interface provided on the head-wearable display device shown in FIG. 1 is a male plug provided on the cable, and may be inserted into a corresponding type of female receptacle provided on the mobile phone. Certainly, the communication interface may be of other types, e.g., a female receptacle, and a cable with a male plug at both ends is employed to connect the mobile phone with the head-wearable display device.

The mobile phone in the present embodiment may be replaced with other portable terminals such as a tablet computer.

Embodiment 2

Figure 2:
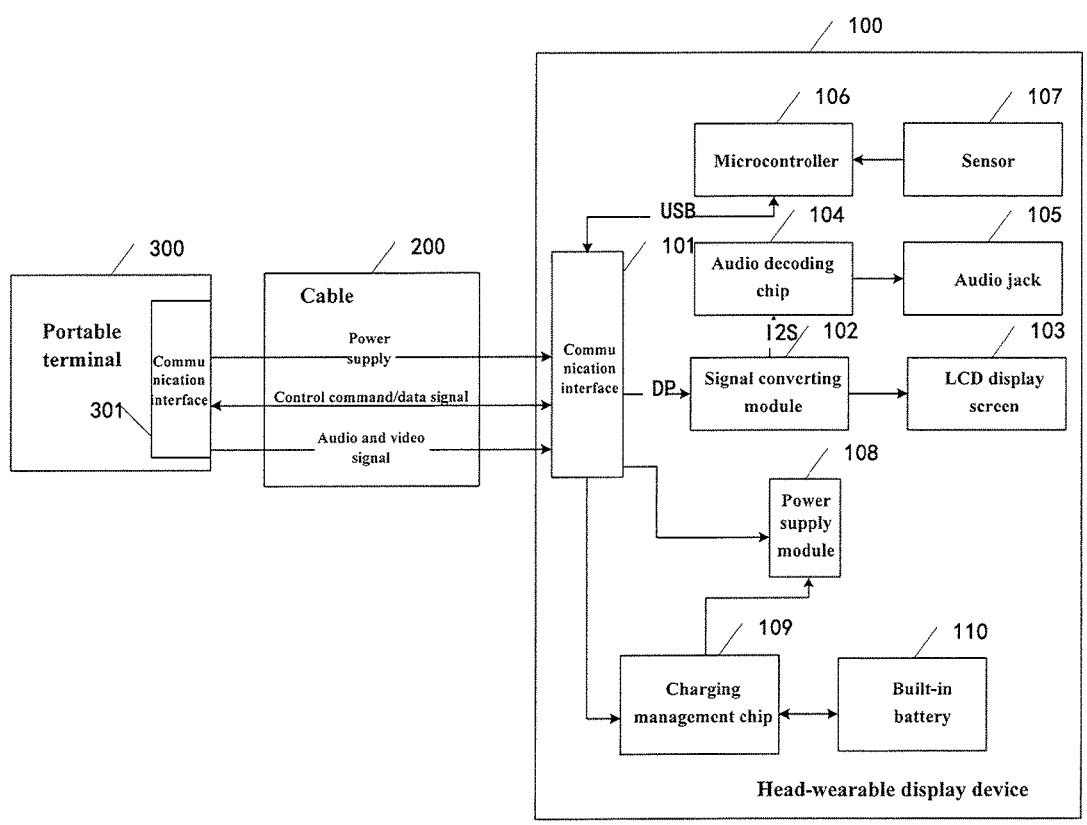
FIG. 2 is a structural block diagram of a head-wearable display device according to an embodiment of the present invention.

FIG. 2 is a structural block diagram of a head-wearable display device according to an embodiment of the present invention. As shown in FIG. 2, the head-wearable display device 100 is provided with one communication interface 101 via which the head-wearable display device 100 is connected with a portable terminal 300.

A cable 200 is used to connect the communication interface 101 on the head-wearable display device 100 and a communication interface 301 on the portable terminal 300. The cable 200 may be integrated with the head-wearable display device 100. An end of the cable 200 is provided with a male plug for insertion into a female receptacle provided on the portable terminal 300 to achieve connection of the communication interface 101 and the communication interface 301.

After the head-wearable display device 100 establishes the above connection with the portable terminal 300, through the connection the head-wearable display device 100 may obtain audio and video data from the portable terminal 300; meanwhile the head-wearable device 100 may exchange data with the portable terminal 300, e.g., the portable device 300 may send a control command to the head-wearable display device 100, and the head-wearable display device 100 may transmit corresponding data signals back to the portable terminal; and the portable terminal 300 may supply power to the head-wearable display device 100 via this connection.

The head-wearable device 100 according to the present embodiment may operate normally only via one cable connected to the portable terminal 300, solves the problem that the current head-wearable display device has to be connected to the host machine via a plurality of cables and therefore cannot apply to the portable terminal, the required number of cables is reduced, and the cost of the device is lowered.

In the present embodiment, a communication interface 101 is a USB Type-C interface, and the portable terminal 300 is a smart mobile phone or tablet computer with a USB Type-C interface. The USB Type-C interface standard is one type of USB 3.1 standard, possesses four pairs of differential signals, enables full duplex communication and supports 5V/20A at most. USB Type-C may convert some or all differential signal channels therein to Displayport signal channels. If there are still remaining differential signals, they may be used for USB data transmission. Hence, the present embodiment uses the USB Type-C interface to implement high grade of integration of signals, meanwhile transmit audio and video data and data signals, and implements power supply from the portable terminal 300 to the head-wearable display device 100. The USB Type-C connector is small in size, can be inserted from both positive and negative sides and is more adapted for a portable terminal such as a smart mobile phone or tablet computer.

In the present embodiment, the communication interface 101 on the head-wearable display device 100 is a cabled USB Type-C male plug which is inserted in the USB Type-C female receptacle on the portable terminal 100 to achieve connection of the two.

In the present embodiment, in the head-wearable display device 100 is provided a microcontroller 106 and several sensors 107 such as a gyro and an accelerometer connected with the microcontroller 106. The sensors 107 may collect data reflecting a state of the user's head motion. The microcontroller 106 is connected with the communication interface 101 via the USB signal line, obtains the control command transmitted by the portable terminal 300, and transmits data collected by the sensors 107 back to the portable terminal 300 via the communication interface 101.

In the present embodiment, a signal converting module 102 is further provided in the head-wearable display device 100. The signal converting module 102 is connected with the communication interface 101, and converts audio and video data of a Displayport protocol obtained from the portable terminal 300 into audio and video data of a MIPI protocol. The MIPI (Mobile Industry Processor Interface) protocol is an open standard and specification initiated by MIPI Alliance and formulated for mobile application processors. The MIPI protocol is applied extensively. In the present embodiment, the Displayport signal is converted into the MIPI signal to meet demands for hardware manufactured by MIPI standard.

In the present embodiment, in the head-wearable display device 100 is further provided a video output module and an audio output module which are connected with the signal converting module 102 respectively. The video output module is an LCD display screen 103 and used to display a video signal outputted by the signal converting module 102; the audio output module comprises an audio decoding chip 104 and an audio jack 105, and the audio decoding chip 104, via an I2S bus (Inter IC Sound), obtains the audio signal outputted by the signal converting module 102, decodes the audio signal and then transmits it to the audio jack 105.

In the present embodiment, in the head-wearable display device 100 is further provided a power supply module 108 which is connected with the communication interface 101. When the head-wearable display device 100 is connected with the portable terminal 300 via the communication interface 101, the power supply module 108 obtains working power supply from the portable terminal 300 and powers respective modules in the head-wearable display device 100.

In a preferred embodiment, a built-in battery 110 and a charging management chip 109 are further provided in the head-wearable display device 100, and the charging management chip 109 is connected with the communication interface 101, the built-in battery 110 and the power supply module 108 respectively.

When the head-wearable display device 100 is connected to the portable terminal 300 via the communication interface 101, the charging management chip 109 obtains power from the portable terminal 300 to charge the built-in battery 110. When the head-wearable display device 100 is not connected with the portable terminal 300 via the communication interface 101, or the power amount of the portable terminal 300 is insufficient, the charging management chip 109 takes power from the built-in battery 110 to charge the power supply module 108. In the present preferred embodiment, the built-in battery 110 and the charging management chip 109 enable the head-wearable display device 100 to have a self-powering capability, reduce power consumption of the portable terminal 300 and prolong the service life.

To conclude, the head-wearable display device according to the present invention is provided with one communication interface via which the head-wearable device is connected to the portable terminal. Transmission of the audio and video data from the portable terminal to the head-wearable display device, data exchange performed between the portable terminal and the head-wearable display device, and power supply from the portable terminal to the head-wearable display device are simultaneously implemented via the interface, thereby achieving high grade of integration of signals, reducing the number of cables required to establish connection, facilitating designing the design of products and reducing costs of the device; as compared with current externally-connected type head-wearable display device which has to employ a plurality of cables, the head-wearable display device according to the present invention may operate normally in a way of connecting with the portable terminal via only one cable, without occupying too many communication interfaces of the portable terminal. Furthermore, as the weight and size of the portable terminal is obviously less than those of the host machine in the prior art, it exhibits better portability and facilitates improvements of the user's experience.

What are described above are only specific embodiments of the present invention. Under the above teaching of the present invention, those skilled in the art may make other improvements or variations on the basis of the above embodiments. Those skilled in the art should appreciate that the above detailed depictions are only intended to illustrate the present invention, and the protection scope of the present invention should be subject to the protection scope of claims.

What is claimed is:

1. A head-wearable display device, provided with one communication interface via which the head-wearable display device is connected with a portable terminal, to obtain audio and video data from the portable terminal, exchange data with the portable terminal and obtain working power supply from the portable terminal,
    wherein a signal converting module is further provided in the head-wearable display device, the signal converting module is connected with the communication interface, and used to convert audio and video data of a Displayport protocol obtained from the portable terminal into audio and video data of a MIPI protocol.

2. The head-wearable display device according to claim 1, wherein the communication interface is a USB Type-C interface; the portable terminal is a smart mobile phone or tablet computer with the USB Type-C interface.

3. The head-wearable display device according to claim 2, wherein the communication interface is a cabled USB Type-C male plug.

4. The head-wearable display device according to claim 3, wherein in the head-wearable display device is provided a microcontroller and several sensors connected with the microcontroller;
    the microcontroller is connected with the communication interface via a USB signal line, obtains a control command transmitted by the portable terminal, and transmits data collected by the several sensors back to the portable terminal.

5. The head-wearable display device according to claim 1, wherein in the head-wearable display device is further provided a video output module and an audio output module which are connected with the signal converting module respectively;
    the video output module is an LCD display screen and used to display a video signal outputted by the signal converting module;
    the audio output module comprises an audio decoding chip and an audio jack; the audio decoding chip, via an I2S bus, obtains an audio signal outputted by the signal converting module, decodes the audio signal and then transmits it to the audio jack for playing.

6. The head-wearable display device according to claim 5, wherein in the head-wearable display device is further provided a power supply module which is connected with the communication interface;
   when the head-wearable display device is connected with the portable terminal via the communication interface, the power supply module obtains working power supply from the portable terminal and powers respective modules in the head-wearable display device.

7. The head-wearable display device according to claim 6, wherein a built-in battery and a charging management chip are further provided in the head-wearable display device, and the charging management chip is connected with the communication interface, the built-in battery and the power supply module respectively;
   when the head-wearable display device is connected with the portable terminal via the communication interface, the charging management chip obtains power from the portable terminal to charge the built-in battery;
   when the head-wearable display device is not connected with the portable terminal via the communication interface, or power amount of the portable terminal is insufficient, the charging management chip takes power from the built-in battery to charge the power supply module.

* * * * *